United States Patent
Iwagami et al.

(10) Patent No.: US 8,994,220 B2
(45) Date of Patent: Mar. 31, 2015

(54) VEHICLE-MOUNTED ELECTRONIC CONTROL DEVICE

(75) Inventors: Yuki Iwagami, Chiyoda-ku (JP); Koji Hashimoto, Chiyoda-ku (JP); Manabu Yamashita, Chiyoda-ku (JP); Yuji Zushi, Chiyoda-ku (JP); Mitsunori Nishida, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 680 days.

(21) Appl. No.: 13/343,804

(22) Filed: Jan. 5, 2012

(65) Prior Publication Data
US 2012/0292984 A1 Nov. 22, 2012

(30) Foreign Application Priority Data
May 16, 2011 (JP) ................................. 2011-109338

(51) Int. Cl.
*H04B 3/00* (2006.01)
*B60R 16/00* (2006.01)

(52) U.S. Cl.
CPC ...................................... *B60R 16/00* (2013.01)
USPC .......................................................... 307/91

(58) Field of Classification Search
USPC .......................................................... 307/91
See application file for complete search history.

(56) References Cited

U.S. PATENT DOCUMENTS

| 6,781,806 B2* | 8/2004 | Hashimoto et al. .......... 361/91.1 |
| 7,400,120 B2* | 7/2008 | Hashimoto et al. .......... 323/267 |
| 8,181,508 B2* | 5/2012 | Cinpinski et al. .......... 73/114.79 |
| 2003/0086226 A1* | 5/2003 | Hashimoto et al. .......... 361/91.1 |
| 2007/0057657 A1* | 3/2007 | Hashimoto et al. .......... 323/282 |

FOREIGN PATENT DOCUMENTS

| JP | 7-95765 A | 4/1995 |
| JP | 2003-316482 A | 11/2003 |

* cited by examiner

*Primary Examiner* — Jared Fureman
*Assistant Examiner* — Duc M Pham
(74) *Attorney, Agent, or Firm* — Sughrue Mion, PLLC; Richard C. Turner (57) ABSTRACT

In a vehicle-mounted electronic control device having a switching power supply in which a switching element is controlled to obtain a predetermined intermediate voltage Va stepped down from a vehicle-mounted battery, and to which a downstream side coil, a flywheel diode, and an output capacitor are connected to suppress a pulsating voltage, a circuit for suppressing reverse conduction for the switching element is provided in order to prevent that the switching element is reversely conducted and thus a charging voltage of the output capacitor is abnormally lowered when a power supply voltage Vb of the vehicle-mounted battery is abnormally lowered.

8 Claims, 5 Drawing Sheets

VEHICLE-MOUNTED ELECTRONIC CONTROL DEVICE

BACKGROUND OF THE INVENTION

1. Field of the Invention

The present invention relates to vehicle-mounted electronic control devices, for example, engine control devices, transmission control devices, or the like. More particularly, the present invention relates to a vehicle-mounted electronic control device equipped with a switching power supply which steps down a power supply voltage fed from a vehicle-mounted battery to obtain an intermediate voltage, and a power supply control circuit unit which supplies a stabilization voltage with low electric power consumption and high accuracy to a control circuit unit including a microprocessor via a linearly controlled type constant voltage controlled power supply fed from the switching power supply.

2. Description of the Related Art

In a switching power supply (alternatively referred to as a switching regulator or a chopper regulator) which controls a current carrying duty of a switching element and obtains a predetermined stabilization voltage, low electric power consumption and a high power stabilization voltage can be obtained. However, ripple fluctuation of an output voltage due to switching operation of the switching element is generated; and therefore, a continuously controlled power supply (referred to as a linearly controlled power supply, a dropper power supply, a series regulator, or the like), which obtains a more highly accurate stabilization voltage by performing continuous control of a conductive state of a second switching element connected in series to the switching element, is subordinately connected. This technique has been widely and practically used.

In this case, when an input voltage of the continuously controlled power supply (output voltage of the switching power supply) is stable, a difference in voltage between input and output is small and thus electric power consumption is suppressed. However, a problem exists in that, when the input voltage is pulsative, the difference in voltage between the input and the output is large and therefore sufficient suppression of the electric power consumption cannot be performed.

In order to reduce pulsating components of the output voltage of the switching power supply, configuration may be such that inductance of a choke coil connected in series and capacitance of an output capacitor are made to increase to switch the switching element at high speed cycle; however, in this case, problems exist in that the choke coil and the output capacitor are increased in size and heat generation due to switching loss of the switching element is increased.

Furthermore, problems exist in that, in the case where a voltage drop of the switching element at the time when the switching element is conducted and driven, not only the heat generation of the switching element is increased, but also a target output voltage cannot be obtained when the power supply voltage of the vehicle-mounted battery is lowered and thus a minimum guaranteed voltage is increased and degraded.

For example, according to the following Patent Document 1, a switching power supply (chopper regulator) and an NPN type junction transistor serving as a continuously controlled power supply (series regulator), both of which are subordinately connected with each other, are used; and base current of each transistor is supplied from an external power supply which feeds to the switching power supply. Therefore, problems exist in that a base voltage of a former stage transistor is restricted to equal to or lower than a collector voltage and therefore a voltage drop between collector and emitter terminals at the time when the former stage transistor is conducted and driven is large; and accordingly, not only heat generation of the former stage transistor is increased, but also a target output voltage cannot be obtained when a power supply voltage is lowered and thus a minimum guaranteed voltage is increased and degraded.

Furthermore, according to the following Patent Document 2, in a switching power supply (first power supply regulator) and a continuously controlled power supply (second power supply regulator), both of which are subordinately connected with each other, the switching power supply on the former stage side uses a P channel type field effect transistor. In this case, a voltage drop between source and drain terminals at the time when the former stage transistor is completely conducted is small. However, a problem exists in that, in the case of the P channel type transistor, when the power supply voltage is lowered to equal to or lower than a load side voltage, a reverse conductive state of the transistor is generated and accordingly an undershoot is generated in a charging voltage of an output capacitor.

In order to prevent this problem, in the case of Patent Document 2, a diode for backflow prevention is connected in series to a source terminal of the transistor. Therefore, problems exist in that, even when the voltage drop between the source and drain terminals at the time when the former stage transistor is conducted and driven is small, a voltage drop including a voltage drop due to the diode for backflow prevention is large; and accordingly, not only heat generation of the former stage transistor including the diode is increased, but also a target output voltage cannot be obtained when the power supply voltage is lowered and thus a minimum guaranteed voltage is increased and degraded.

[Patent Document]

[Patent Document 1] Japanese Unexamined Patent Publication No. H07-095765 (FIG. 1, Abstract of the disclosure)

[Patent Document 2] Japanese Unexamined Patent Publication No. 2003-316482 (FIG. 1, Abstract of the disclosure)

According to a direct current stabilization power supply apparatus by Patent Document 1, even when reverse conduction of the switching element is generated, a problem does not exist because of high resistance; however, problems exist in that a forward voltage drop of the switching element is large, the heat generation is increased, and the minimum guaranteed voltage is increased and degraded.

Furthermore, according to a power supply circuit of Patent Document 2, problems exist in that, although reverse conduction of the switching element is possibly generated, the reverse conduction is prevented by the diode for backflow prevention, a forward voltage drop of the switching element including the diode is large, the heat generation is increased, and the minimum guaranteed voltage is increased and degraded.

Incidentally, in the case where reverse the conduction is generated in the switching element when the power supply voltage is abnormally lowered, charging electric charge of the output capacitor of the switching element is discharged to the upstream power supply side via a choke coil, current flowing through the choke coil is not steeply decreased even when voltages at both sides coincide, and discharging is maintained for an interim period; and accordingly, an undershoot in which a voltage at both ends of the output capacitor on the downstream side is more lowered than a voltage on the upstream power supply side is generated. As a result, a problem exists in that, despite that the power supply voltage is equal to or higher than the minimum guaranteed voltage, an actually obtained voltage is smaller voltage and a microprocessor driven by a constant voltage controlled power supply is erroneously operated.

BRIEF SUMMARY OF THE INVENTION

This invention has been made to solve the problem as described above and an object of the present invention is to provide a vehicle-mounted electronic control device equipped with a constant voltage control device with low electric power consumption, which reduces a forward voltage drop of a switching element, suppresses an undershoot at the time when a power supply voltage is abnormally lowered, and generates an output voltage stabilized against fluctuations of the power supply voltage in a wide range.

According to the present invention, there is provided a vehicle-mounted electronic control device including: a switching element constituting a switching power supply which is operated using a power supply voltage fed from a vehicle-mounted battery as an input voltage and is for stepping down the power supply voltage to generate a predetermined intermediate voltage; a continuously controlled type first constant voltage controlled power supply or a same type second constant voltage controlled power supply, which is connected in series to a later stage of the switching element and generates a first stabilization voltage or a second stabilization voltage; and a control circuit unit including a main control circuit section which is fed from the second constant voltage controlled power supply and has at least a microprocessor, a program memory, and a random access memory (RAM) memory, or a subsidiary control circuit section which is fed from the first constant voltage controlled power supply and is operative in cooperation with the main control circuit section. In the vehicle-mounted electronic control device, a downstream side coil serving as an inductive element is connected in series between the switching element and the first constant voltage controlled power supply or between the switching element and the second constant voltage controlled power supply; a flywheel diode is connected between the downstream side coil and a ground circuit on the upstream side of the downstream side coil; and an output capacitor is connected between the downstream side coil and the ground circuit on the downstream side of the downstream side coil. Then, a value of an induced time constant which is a ratio between inductance of the downstream side coil and load resistance of an electric load fed from the switching element uses a value larger than a switching cycle at which switching control of the switching element is performed; the switching element is a P channel type or an N channel type field effect transistor; and a circuit for suppressing reverse conduction is connected to a gate circuit of the field effect transistor; and a reset circuit which is for initializing at least the microprocessor when the intermediate voltage is lowered to less than a predetermined value is provided. When the power supply voltage is temporarily and abnormally lowered, charging electric charge of the output capacitor is flown back to the upstream power supply side by reverse conduction of the switching element to suppress from generating an undershoot; and the reset circuit prevents the microprocessor from being initialized by the undershoot.

According to the vehicle-mounted electronic control device of the present invention, advantageous effects exist in that the inductance of the downstream side coil provided in an output circuit of the switching element is set to be large, whereby a pulsating voltage of the output capacitor charged from the downstream side coil can be suppressed; at the same time, the undershoot of a charging voltage of the output capacitor can be suppressed, the undershoot being generated when the power supply voltage of the vehicle-mounted battery is temporarily and abnormally lowered with the increase of the inductance of the downstream side coil; the intermediate voltage with the small pulsating voltage can be obtained while preventing the microprocessor from being initialized at random; and the stabilization voltage with high accuracy and low electric power consumption can be obtained via the first or the second constant voltage controlled power supply.

Furthermore, an advantageous effect exists in that a voltage drop at the time when the switching element which is for obtaining the intermediate voltage is close-circuited and driven becomes small, whereby a minimum guaranteed voltage of the power supply voltage can be set to be smaller.

The foregoing and other object, features, and advantages of the present invention will become more apparent from the following detailed description of preferred embodiments and description shown in the accompanying drawings.

DETAILED DESCRIPTION OF THE INVENTION

Hereinafter, preferred embodiments of the present invention will be described in detail with reference to drawings. Incidentally, the same reference numerals are given to those identical or equivalent to constituent elements shown in the respective drawings and their detail description will not be repeated.

Preferred Embodiment 1

(1) Explanation of Configuration

Figure 1:
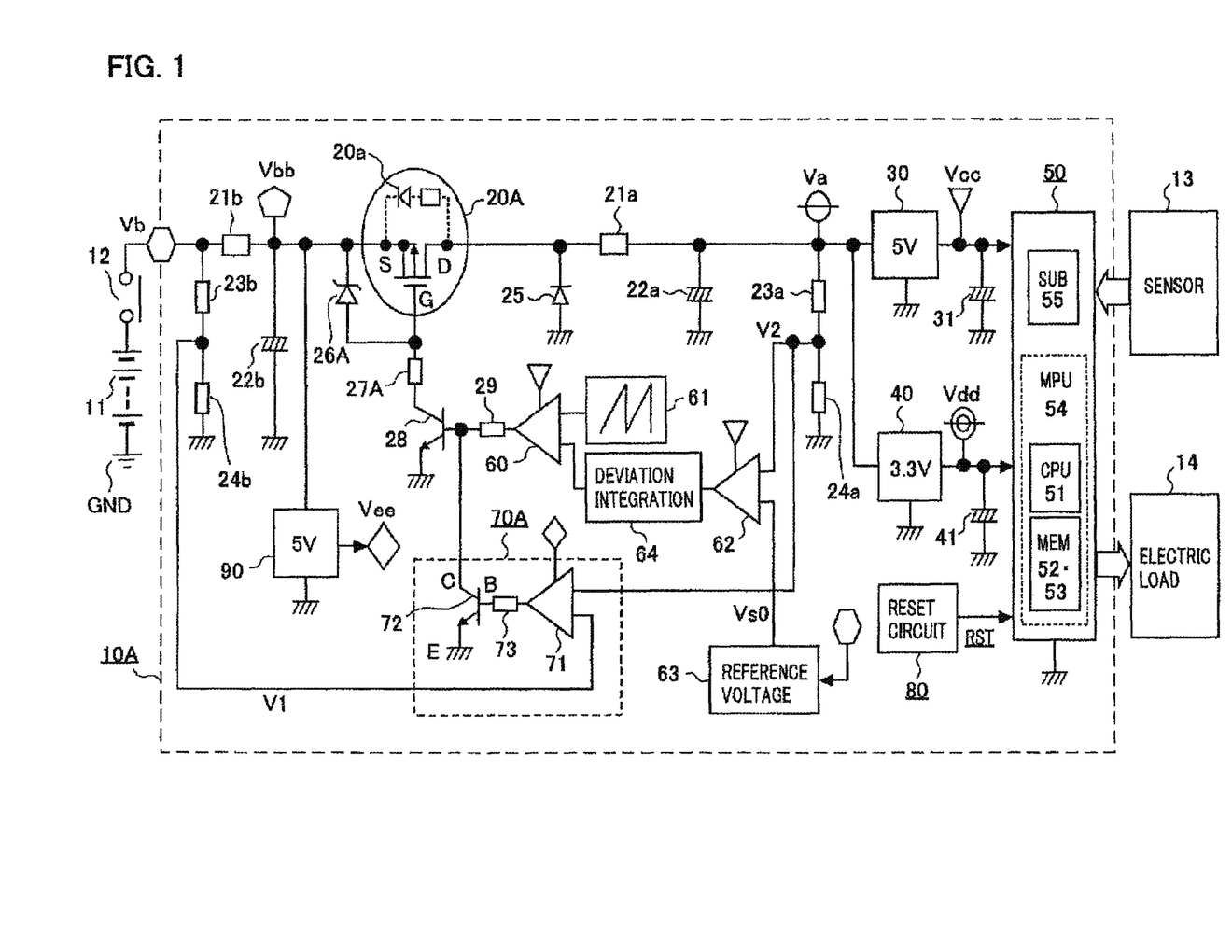
FIG. 1 is an entire-circuit block diagram of a vehicle-mounted electronic control device in a preferred embodiment 1 of the present invention.

FIG. 1 is an entire-circuit block diagram of a vehicle-mounted electronic control device in a preferred embodiment 1 of the present invention. In FIG. 1, a vehicle-mounted electronic control device 10A housed in a sealed housing is configured such that a power supply serving as a power supply voltage Vb is supplied from a vehicle-mounted battery 11 connected to a vehicle body in which a negative terminal is a ground circuit GND via an output contact 12 of a power supply relay (not shown in the drawing), and a vehicle-mounted electric load group 14 connected externally via a connection connector (not shown in the drawing) is driven and controlled in response to an operation state of a vehicle-mounted sensor group 13 connected externally via a connection connector (not shown in the drawing) and the contents of a control program stored in a program memory (to be described later).

A switching element 20A, which is located in the vehicle-mounted electronic control device 10A and constitutes a switching power supply, is connected in series between the vehicle-mounted battery 11 and a first constant voltage controlled power supply 30 and between the vehicle-mounted battery 11 and a second constant voltage controlled power supply 40. An upstream side coil 21b and a downstream side coil 21a, both of which are choke coils serving as inductive elements, are connected in series on the upstream side and the downstream side of the switching element 20A, respectively. A power supply capacitor 22b is connected between the upstream side coil 21b and the ground circuit GND on the downstream end of the upstream side coil 21b; and an output capacitor 22a is connected between the downstream side coil 21a and the ground circuit GND on the downstream end of the downstream side coil 21a.

Incidentally, a voltage at both ends of the power supply capacitor 22b is an actual working power supply voltage Vbb for the switching element 20A; a voltage at both ends of the output capacitor 22a is an intermediate voltage Va; voltage dividing resistors 23a, 24a connected in series with each other divide the intermediate voltage Va to generate a second voltage V2; and voltage dividing resistors 23b, 24b connected in series with each other divide the power supply voltage Vb (or the actual working power supply voltage Vbb) to generate a first voltage V1. Furthermore, a flywheel diode 25 is connected between the ground circuit GND and a connection node of the switching element 20A and the downstream side coil 21a. Coil current fed from the downstream side coil 21a to the output capacitor 22a, the first constant voltage controlled power supply 30, and the second constant voltage controlled power supply 40 when the switching element 20A is close-circuited is commutated to the flywheel diode 25 by the fact that the switching element 20A is open-circuited; and accordingly, electromagnetic energy accumulated in the downstream side coil 21a is discharged. A voltage limiting diode 26A is connected between a source terminal and a gate terminal of the switching element 20A that is a P channel type field effect transistor, and a series circuit of a driving resistor 27A and a driving transistor 28 is connected between the gate terminal and the ground circuit GND. In addition, the driving transistor 28 is connected to an output terminal of a later stage comparator 60 (to be described later) via a base resistor 29.

In the first constant voltage controlled power supply 30 to which the stabilized intermediate voltage Va is supplied from the switching element 20A, a negative feedback control circuit (not shown in the drawing) is incorporated; and a conductive state is continuously controlled so that an output voltage is a first stabilization voltage Vcc that is, for example, DC 5 V. A load side capacitor 31 is connected to the first constant voltage controlled power supply 30. Similarly, in the second constant voltage controlled power supply 40 to which the stabilized intermediate voltage Va is supplied from the switching element 20A, a negative feedback control circuit (not shown in the drawing) is incorporated; and a conductive state is continuously controlled so that an output voltage is a second stabilization voltage Vdd that is, for example, DC 3.3 V. A load side capacitor 41 is connected to the second constant voltage controlled power supply 40.

A control circuit unit 50 includes a main control circuit section 54 and a subsidiary control circuit section 55. The main control circuit section 54 has a microprocessor 51, a program memory 52, and a RAM memory 53. The subsidiary control circuit section 55 is a logic circuit or a subsidiary central processing unit (sub-CPU) (not shown in the drawing), which is operative in cooperation with the main control circuit section 54. The second stabilization voltage Vdd is supplied to the main control circuit section 54; and the first stabilization voltage Vcc is supplied to the subsidiary control circuit section 55.

An output voltage of a pulse width modulation control circuit 61 which generates a saw tooth wave signal pulse at a predetermined cycle is applied to a positive side input terminal of the later stage comparator 60 which constitutes a negative feedback duty factor control circuit, the output voltage being to be compared with a deviation integral value (to be described later). The second voltage V2 proportional to the intermediate voltage Va divided by the voltage dividing resistors 23a, 24a is applied to a positive side input terminal of a comparison circuit on the former stage side 62; and a predetermined comparison reference voltage Vs0 generated by a reference voltage generating circuit 63 is applied to a negative side input terminal thereof. In a deviation integration circuit 64, an output voltage is gradually increased if the second voltage V2 is equal to or higher than the comparison reference voltage Vs0 and the output voltage is gradually decreased if the second voltage V2 is equal to or lower than the comparison reference voltage Vs0; however, in fact, an output proportional to a deviation component between the second reference voltage V2 and the comparison reference voltage Vs0 is also added to generate a proportional integral feedback signal voltage.

In the later stage comparator 60, an output voltage level becomes "H" at a time zone at which a voltage of the saw tooth wave signal pulse that is the output voltage of the pulse width modulation control circuit 61 becomes equal to or higher than the output voltage of the deviation integration circuit 64; and the switching element 20A is close-circuited and driven via the base resistor 29, the driving transistor 28, and the driving resistor 27A.

A second voltage V2 obtained by dividing the intermediate voltage Va is applied to a positive input terminal of a voltage comparator 71 which constitutes a circuit for suppressing reverse conduction 70A; the first voltage V1 obtained by dividing the power supply voltage Vb (alternatively, the actual working power supply voltage Vbb may be used) is applied to a negative input terminal; and an output terminal of the voltage comparator 71 is made to conduct and drive an interruption transistor 72 via a base resistor 73. A collector terminal and an emitter terminal of the interruption transistor 72 that is an NPN type junction transistor are connected between a base terminal and an emitter terminal of the driving transistor 28.

Incidentally, resistance distribution of the voltage dividing resistors 23a, 24a, 23b, 24b is set to be a relationship where the first voltage V1 equals to the second voltage V2 when potential (voltage from the ground circuit GND) is the same at the source terminal and a drain terminal of the switching element 20A.

Therefore, when an abnormal state in which the second voltage V2 is larger than the first voltage V1 is generated, the output logic level of the voltage comparator 71 becomes "H" and the interruption transistor 72 is conductive; and accordingly, the driving transistor 28 is nonconductive and the switching element 20A is also in a nonconductive state. However, this is in a state where a parasitic diode circuit 20a is connected in parallel between the source terminal and the drain terminal of the switching element 20A that is the P channel type field effect transistor, and this is in a state where current flowing back from the drain terminal to the source terminal cannot be completely interrupted.

A reset circuit 80 for the microprocessor 51 is to be described later in FIG. 2. A subsidiary control power supply 90 is fed from the actual working power supply voltage Vbb (alternatively, the power supply voltage Vb may be used) to generate a subsidiary stabilization voltage Vcc with a small power of, for example, DC 5 V, and the subsidiary control power supply 90 is used as a power supply for the voltage comparator 71 and for a former stage comparator 82b and a final stage voltage abnormality detection circuit 87 shown in FIG. 2.

Incidentally, in FIG. 1, a power supply of the entire negative feedback duty factor control circuit including the later stage comparator 60 and the comparison circuit 62 uses the first stabilization voltage Vcc; however, in the case where, before the first stabilization voltage Vcc reaches a predetermined target voltage and when the negative feedback duty factor control circuit is not operated, the switching element 20A is close-circuited and driven by the output of the subsidiary control power supply 90.

Next, FIG. 2 that is a detailed circuit diagram of the reset circuit 80 in FIG. 1 will be described.

Figure 2:
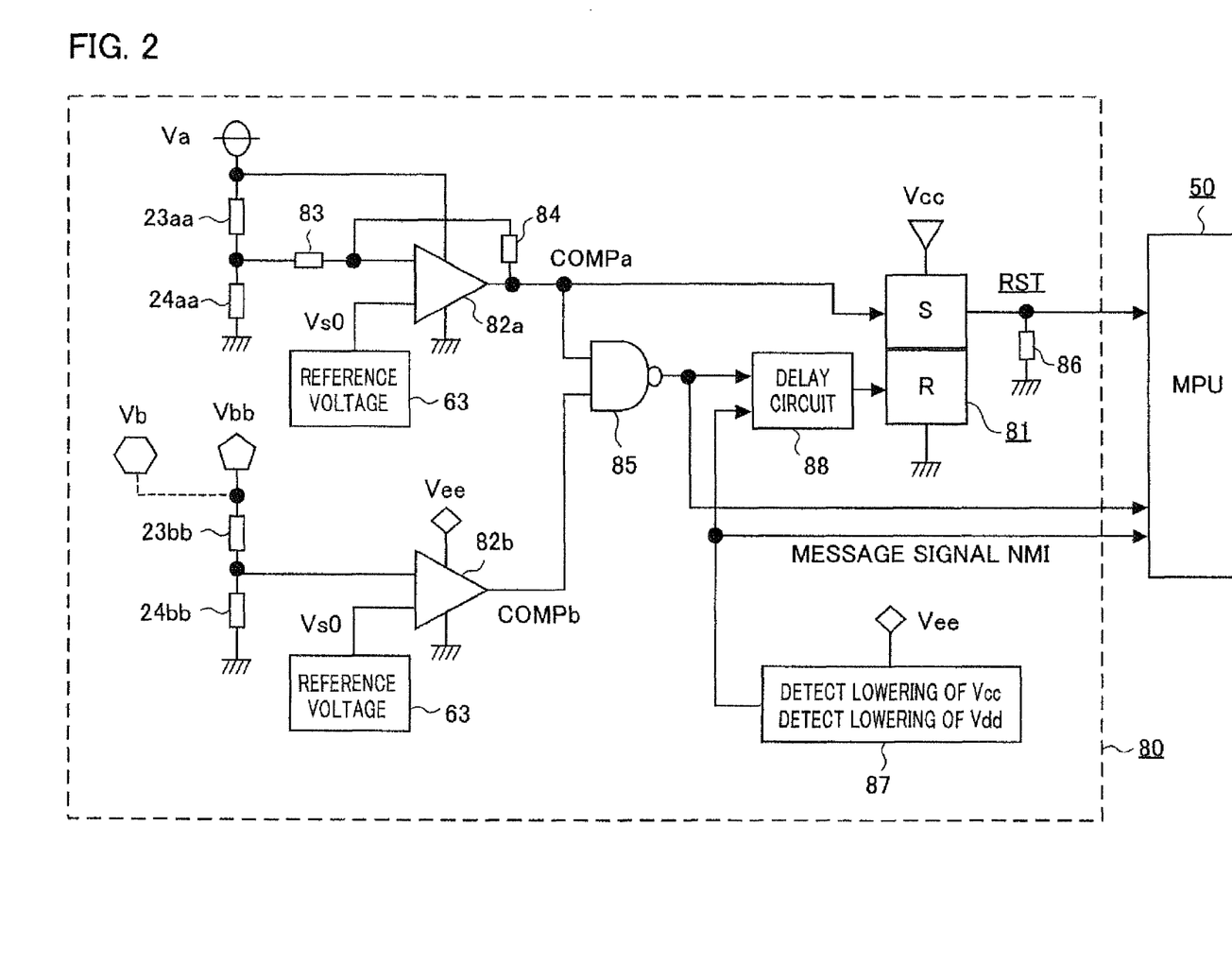
FIG. 2 is a detailed circuit diagram of a reset circuit in FIG. 1.

In FIG. 2, a flip-flop circuit 81 which constitutes the reset circuit 80 includes a set input terminal S and a reset input terminal R. When a signal voltage of a logic level "H" is applied to either terminal, its output logic level becomes "H"; and even when the logic level of the input signal voltage is changed to "L," the output logic level is maintained at "H" until the signal voltage of the logic level "H" is applied to the other terminal. An output signal for a set input signal S is used as a reset signal RST for the microprocessor 51 in the control circuit unit 50.

Incidentally, when both logic levels of the set input terminal S and the reset input terminal R of the flip-flop circuit 81 become "H," the reset input terminal R is given priority over the set input terminal S.

Furthermore, the microprocessor 51 performs reset processing and is initialized when the logic level of the reset signal RST is "L." Therefore, when the flip-flop circuit 81 is reset, the microprocessor 51 is reset. A positive input terminal of the later stage comparator 82a is connected to a series connection node of voltage dividing resistors 23aa, 24aa via an input resistor 83 and is connected to an output terminal of the later stage comparator 82a via a positive feedback resistor 84. The voltage dividing resistors 23aa, 24aa are connected in series with each other and the intermediate voltage Va is applied thereto. A reference voltage Vs0 generated by the reference voltage generating circuit 63 is applied to a negative input terminal of the later stage comparator 82a; and an output terminal of the later stage comparator 82a is connected to the set input terminal S of the flip-flop circuit 81 and is connected to one of input terminals of a negative logical product (NAND) output element 85. A positive input terminal of the former stage comparator 82b is connected to a series connection node of voltage dividing resistors 23bb, 24bb. The voltage dividing resistors 23bb, 24bb are connected in series with each other and the actual working power supply voltage Vbb (alternatively, the power supply voltage Vb may be used) is applied thereto.

The reference voltage Vs0 generated by the reference voltage generating circuit 63 is applied to a negative input terminal of the former stage comparator 82b; and an output terminal of the former stage comparator 82b is connected to the other input terminal of the NAND output element 85. An output terminal of the NAND output element 85 is connected to the reset input terminal R of the flip-flop circuit 81 via a delay circuit 88; an output signal of the NAND output element 85 is transmitted to the microprocessor 51 as a message signal NMI related to abnormal lowering of voltage; and the microprocessor 51 performs emergency saving processing before the microprocessor 51 is initialized by the reset signal RST.

A former stage comparison signal COMPb that is an output signal of the a former stage comparator 82b becomes a logic level "L" when the actual working power supply voltage Vbb (alternatively, the power supply voltage Vb) is less than a determination threshold voltage Vsb (for example, DC 4.5 V); a later stage comparison signal COMPa that is an output signal of the later stage comparator 82a becomes a logic level "L" when the intermediate voltage Va is a first determination threshold voltage Vsa (for example, less than DC 4.5 V); the flip-flop circuit 81 is reset when the logic level of either the comparison signal COMPa or COMPb becomes "L"; and the logic level of the set output becomes "L"; and accordingly, reset processing of the microprocessor 51 is performed.

The later stage comparison signal COMPa that is the output signal of the later stage comparator 82a becomes a logic level "H" when the intermediate voltage Va becomes equal to or higher than the first determination threshold voltage Vsa (for example, DC 4.5 V); and the flip-flop circuit 81 is set and the logic level of a set output becomes "H"; and accordingly, the reset of the microprocessor 51 is released. Once the logic level of the later stage comparison signal COMPa becomes "H," an addition voltage for the positive input terminal is generated by the positive feedback resistor 84, for example, the intermediate voltage Va becomes less than a second determination threshold voltage Vsaa=Vsa−ΔVsa (for example, 4.5−0.5=4.0 V); and accordingly, the logic level of the later stage comparison signal COMPa is returned to "L." Incidentally, it is proper to select a value of an intermediate area between the first stabilization voltage Vcc (for example, DC 5 V) and the second stabilization voltage Vdd (for example, DC 3.3 V) as a value of the determination threshold voltage Vsb, the first determination threshold voltage Vsa, or the second determination threshold voltage Vsaa.

A pull-down resistor 86 connected to a setting output circuit of the flip-flop circuit 81 is to keep the reset signal for the microprocessor 51 effective by setting the reset signal RST to a logic level "L" until the first stabilization voltage Vcc is established and the flip-flop circuit 81 starts operation. When the first stabilization voltage Vcc is, for example, equal to or lower than DC 4.5 V or the second stabilization voltage Vdd is, for example, equal to or lower than DC 3.0 V, the final stage voltage abnormality detection circuit 87 supplies a signal of a logic level "H" to the reset input terminal R of the flip-flop circuit 81 via the timer circuit 88 and transmits the logic level "H" to the microprocessor 51 as a message signal NMI related to the abnormal lowering of voltage; and the microprocessor 51 performs emergency saving processing before the microprocessor 51 is initialized by the reset signal RST. Accordingly, when the first stabilization voltage Vcc and the second stabilization voltage Vdd are abnormally lowered during operation, initialization processing is performed before the main control circuit section 54 and the subsidiary control circuit section 55 are not operated.

(2) Explanation of Function and Operation

Next, function and operation of the vehicle-mounted electronic control device of the preferred embodiment 1 of the present invention as configured in FIG. 1 and FIG. 2 will be described in detail by using time charts shown in FIG. 3 and FIG. 4.

First, brief description will be made with reference to FIG. 1 and FIG. 2. When a power supply switch (not shown in the drawing) is close-circuited and the output contact 12 of the power supply relay is close-circuited, the microprocessor 51 in the electronic control device 10A stars to operate and the electrical load group 14 is driven and controlled in response to an operation state of the vehicle-mounted sensor group 13 and the contents of a control program preliminarily stored in the program memory 52.

When the not-shown power supply switch is open-circuited, the power supply relay is continuously driven for an interim period, for example, processing in which learning information during operation is transferred to and saved in a nonvolatile memory is completed; and then, the power supply relay is de-energized and the output contact is open-circuited. As for increasing states of respective voltages during power-on, a normal voltage is reached in the order of the power supply voltage Vb, the actual working power supply voltage Vbb, the intermediate voltage Va, the second constant voltage controlled power supply 40, and the first constant voltage controlled power supply 30. As for decreasing states of respective voltages during power-off, a voltage is decreased in the order of the power supply voltage Vb, the actual working power supply voltage Vbb, the intermediate voltage Va, the first constant voltage controlled power supply 30, and the second constant voltage controlled power supply 40.

The reset circuit 80 shown in FIG. 2 monitors the voltage level of the power supply voltage Vb (alternatively, the actual working power supply voltage Vbb) and the intermediate voltage Va to perform a reset command of the microprocessor 51 and its release; and accordingly, the microprocessor 51 starts to operate. Next, FIG. 3 that is time charts showing respective states corresponding to the power-on and the power-off will be described.

Figure 3:
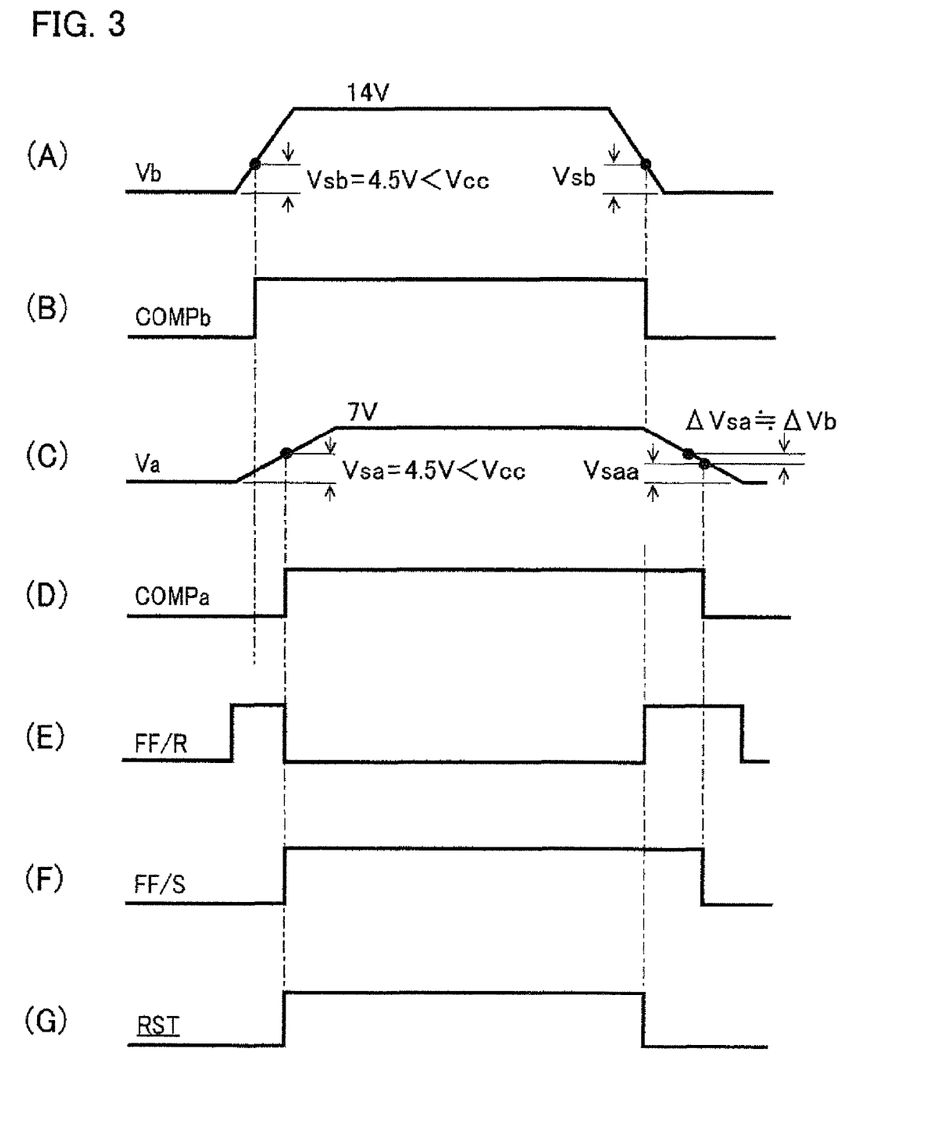
FIG. 3 is time charts for explaining the entire operation of the preferred embodiment 1 of the present invention.

FIG. 3(A) shows an aging characteristic of the power supply voltage Vb; and the power supply voltage Vb is increased from 0 V to, for example, 14 V in response to the power-on and is decreased from 14 V to 0 V in response to the power-off. Incidentally, increase and decrease gradients at the time of the power-on and the power-off are depicted by enlarging and exaggerating a temporal axis; and hereinafter, increase and decrease gradients are depicted in the same manner.

FIG. 3(B) shows the logic level of the former stage comparison signal COMPb of FIG. 2; the logic level is changed from "L" to "H" at the time when the power supply voltage Vb in FIG. 3(A) becomes equal to or higher than the determination threshold voltage Vsb (for example, 4.5 V); and the logic level is returned from "H" to "L" at the time when the power supply voltage Vb becomes less than the determination threshold voltage Vsb.

FIG. 3(C) shows an aging characteristic of the intermediate voltage Va; and the intermediate voltage Va is increased from 0 V to, for example, 7 V in response to the power-on and is decreased from 7 V to 0 V in response to the power-off. Incidentally, increasing and decreasing characteristics of the intermediate voltage Va are more delayed than increasing and decreasing characteristics of the power supply voltage Vb. This is due to the influence of the power supply capacitor 22b and the output capacitor 22a and the influence of responsiveness of negative feedback control for obtaining the intermediate voltage Va.

FIG. 3(D) shows the logic level of the later stage comparison signal COMPa of FIG. 2; the logic level is changed from "L" to "H" at the time when the intermediate voltage Va becomes equal to or higher than the first determination threshold voltage Vsa (for example, 4.5 V) in FIG. 3(C) and the logic level is changed from "H" to "L" when the intermediate voltage Va becomes less than the second determination threshold voltage Vsaa (for example, 4.5−0.5=4.0 V).

FIG. 3(E) shows the logic level of an output signal of the NAND output element 85 applied to the reset input terminal R of the flip-flop circuit 81 of FIG. 2; and the output logic level becomes "H" at the time when at least either the former stage comparison signal COMPb of FIG. 3(B) or the later stage comparison signal COMPa of FIG. 3(D) is a logic level "L."

FIG. 3(F) shows the logic level of the later stage comparison signal COMPa applied to the set input terminal S of the flip-flop circuit 81 of FIG. 2, and this is the same as that of FIG. 3(D). FIG. 3(G) corresponds to a set output signal of the flip-flop circuit 81 of FIG. 2 and shows the logic level of the reset signal RST to be applied to a reset terminal of the microprocessor 51, and this is the same logic signal as an inverted signal of a reset input signal of FIG. 3(E).

However, in fact, when the first stabilization voltage Vcc or the second stabilization voltage Vdd is abnormally lowered by abnormality of the first constant voltage controlled power supply 30 itself or the second constant voltage controlled power supply 40 itself during normal operation, the flip-flop circuit 81 is reset regardless that the logic level of the later stage comparison signal COMPa maintains "H" for an interim period; and therefore, FIG. 3(G) and FIG. 3(E) do not necessarily always become an inverting logic level.

Next, FIG. 4 that is time charts showing respective states in the case where the power supply voltage is temporarily steeply decreased and recovered during normal operation will be described.

Figure 4:
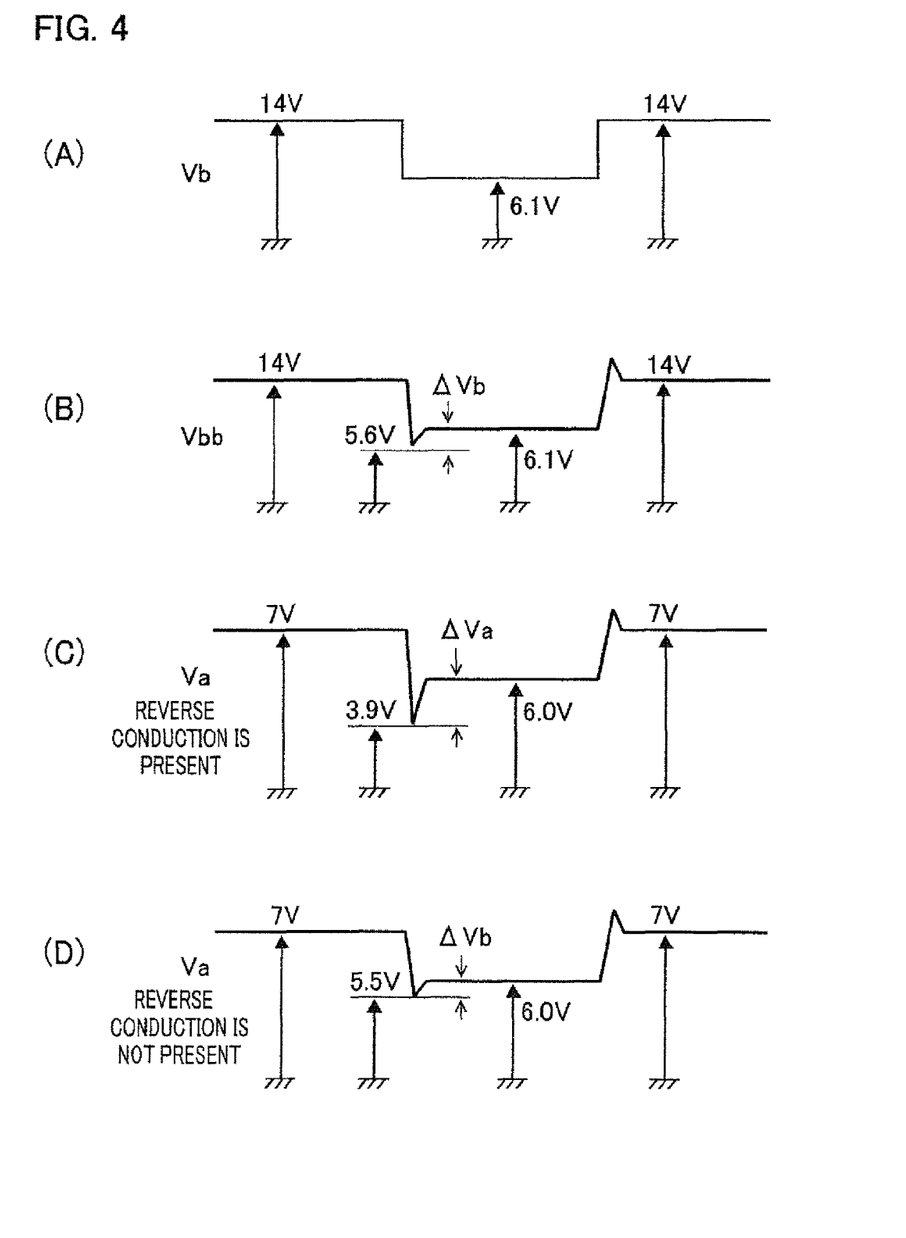
FIG. 4 is time charts at the time of abnormal lowering of voltage in the preferred embodiment 1 of the present invention.

FIG. 4(A) shows an aging characteristic of the power supply voltage Vb that the power supply voltage Vb is temporarily steeply decreased from DC 14 V to DC 6.1 V and is recovered to DC 14 V again. Such steep decrease and recovery are generated in the case where, for example, a motor for starting an engine is driven.

FIG. 4(B) shows an aging characteristic of the actual working power supply voltage Vbb corresponding to FIG. 4(A); and when the power supply voltage Vb is steeply decreased from DC 14 V to DC 6.1 V, the actual working power supply voltage Vbb is also steeply decreased from DC 14 V to DC 6.1V; however, an undershoot is generated in the actual working power supply voltage Vbb and a decreased deviation voltage ΔVb (for example, DC 0.5 V) is generated. This is generated by the fact that electric charge accumulated in the power supply capacitor 22b is discharged via the upstream side coil 21b with a steep decrease of the power supply voltage Vb, and discharging is maintained for an interim period due to the influence of inductance of the upstream side coil 21b even after the steeply decreased power supply voltage Vb becomes equal to the voltage at both ends of the power supply capacitor 22b. Similarly, at the time when the power supply voltage Vb is recovered to the original voltage, the actual working power supply voltage Vbb is overshot and an increased deviation voltage is generated.

FIG. 4(C) shows an aging characteristic of the intermediate voltage Va corresponding to FIG. 4(A); and when the power supply voltage Vb is steeply decreased from DC 14 V to DC 6.1 V, the intermediate voltage Va is steeply decreased from DC 7V to DC 6V; however, an undershoot is generated in the intermediate voltage Va and a decreased deviation voltage ΔVa is generated. However, the circuit for suppressing reverse conduction 70A of FIG. 1 is not provided in the case of FIG. 4(C). FIG. 4(C) shows the case where the switching element 20A is reversely conducted from the drain terminal toward the source terminal; the decreased deviation voltage ΔVa becomes, for example, DC 2.1 V; and the undershoot voltage is lowered to DC 3.9 V. As a result, the logic level of the later stage comparison signal COMPa in FIG. 2 becomes temporarily "L" and the microprocessor 51 is reset.

This is generated by the fact that electric charge accumulated in the output capacitor 22a is discharged via the downstream side coil 21a with a steep decrease of the power supply voltage Vb, and discharging is maintained for an interim period due to the influence of inductance of the downstream side coil 21a even after the steeply decreased actual working power supply voltage Vbb becomes equal to the voltage at both ends of the output capacitor 22a. Similarly, at the time when the power supply voltage Vb is recovered to the original voltage, the intermediate voltage Va is overshot and an increased deviation voltage is generated.

On the other hand, FIG. 4(D) shows an aging characteristic of the intermediate voltage Va as in FIG. 4(C). However, in the case of FIG. 4(D), the circuit for suppressing reverse conduction 70A of FIG. 1 is provided. FIG. 4(D) shows the case where the switching element 20A is not reversely conducted from the drain terminal to the source terminal.

However, this case is in a state where the parasitic diode circuit 20a including a parasitic diode and a series resistance is connected in parallel between the drain terminal and the source terminal of the switching element 20A; and accordingly, even when reverse conduction of the switching element 20A itself is blocked, backflow current due to the parasitic diode circuit 20a is generated, a decreased deviation voltage ΔVa becomes, for example, DC 0.5 V, and the undershoot voltage is lowered to DC 5.5 V. This is generated by the fact that electric charge accumulated in the output capacitor 22a is discharged via the downstream side coil 21a and the parasitic diode circuit 20a with a steep decrease of the power supply voltage Vb, and discharging is maintained for an interim period due to the influence of inductance of the downstream side coil 21a even after the steeply decreased actual working power supply voltage Vbb becomes equal to the voltage at both ends of the output capacitor 22a.

Incidentally, the parasitic diode circuit is connected in parallel to the field effect transistor; and therefore, it is considered that an effect does not exist even when the reverse conduction is prevented by the gate circuit; however, in fact, there is an evident difference between FIG. 4(C) and FIG. 4(D) as shown.

As a result, in the case of FIG. 4(D), the logic level of the later stage comparison signal COMPa in FIG. 2 is maintained at "H" and the microprocessor 51 is not reset. Similarly, at the time when the power supply voltage Vb is recovered to the original voltage, the intermediate voltage Va is overshot and an increased deviation voltage is generated. Overshoots of the power supply voltage Vb and the intermediate voltage Va are removed by the first constant voltage controlled power supply 30 and the second constant voltage controlled power supply 40, and the first stabilization voltage Vcc and the second stabilization voltage Vdd can be obtained.

Incidentally, the description has been made that the switching element 20A is the P channel type field effect transistor in the above description; however, it is to be understood that, in place of this, the P channel type field effect transistor can be replaced with an N channel type field effect transistor.

(3) Features of Preferred Embodiment 1

As is apparent from the above description, the vehicle-mounted electronic control device of the preferred embodiment 1 of the present invention has the following features.

The vehicle-mounted electronic control device of the preferred embodiment 1 of the present invention includes: the switching element 20A constituting a switching power supply which is operated using the power supply voltage Vb fed from the vehicle-mounted battery 11 as an input voltage and is for stepping down the power supply voltage Vb to generate a predetermined intermediate voltage Va; the continuously controlled type first constant voltage controlled power supply 30 or the same type second constant voltage controlled power supply 40, which is connected in series to a later stage of the switching element and generates a first stabilization voltage Vcc or a second stabilization voltage Vdd; and the control circuit unit 50 including the main control circuit section 54 which is fed from the second constant voltage controlled power supply and has at least the microprocessor 51, the program memory 52, and the RAM memory 53, or the subsidiary control circuit section 55 which is fed from the first constant voltage controlled power supply and is operative in cooperation with the main control circuit section 54. In the vehicle-mounted electronic control device 10A, the downstream side coil 21a serving as an inductive element is connected in series between the switching element 20A and the first constant voltage controlled power supply 30 or between the switching element 20A and the second constant voltage controlled power supply 40; the flywheel diode 25 is connected between the downstream side coil 21a and the ground circuit GND on the upstream side of the downstream side coil; and the output capacitor 22a is connected between the downstream side coil 21a and the ground circuit GND on the downstream side of the downstream side coil. Then, a value of an induced time constant La/R0 which is a ratio between inductance La of the downstream side coil 21a and load resistance R0 of an electric load fed from the switching element 20A uses a value larger than a switching cycle at which switching control of the switching element 20A is performed; the switching element 20A is a P channel type or an N channel type field effect transistor; the circuit for suppressing reverse conduction 70A is connected to a gate circuit of the field effect transistor; and a reset circuit 80 which is for initializing at least the microprocessor 51 when the intermediate voltage Va is lowered to less than a predetermined value is provided. When the power supply voltage Vb is temporarily and abnormally lowered, charging electric charge of the output capacitor 22a is flown back to the upstream power supply side by reverse conduction of the switching element 20A to suppress from generating an undershoot; and the reset circuit 80 prevents the microprocessor 51 from being initialized by the undershoot.

That is, the vehicle-mounted electronic control device according to the preferred embodiment 1 is configured such that, in order to suppress an increase of electric power consumption of the constant voltage controlled power supply due to fluctuation of the power supply voltage, in the device which generates the intermediate voltage stabilized by the switching element in which a switching rate is controlled and initializes the microprocessor provided in the control circuit unit when the intermediate voltage is abnormally lowered, the circuit for suppressing reverse conduction of the switching element is provided, and charging electric charge of the output capacitor provided in the output circuit of the switching element is suppressed from being reversely discharged to the vehicle-mounted battery side when the power supply voltage of the vehicle-mounted battery is abnormally lowered.

Therefore, advantageous effects exist in that the inductance of the downstream side coil provided in the output circuit of the switching element is set to be large, whereby a pulsating voltage of the output capacitor charged from the downstream side coil can be suppressed; at the same time, the undershoot of a charging voltage of the output capacitor can be suppressed, the undershoot being generated when the power supply voltage of the vehicle-mounted battery is temporarily and abnormally lowered with the increase of the inductance of the downstream side coil; the intermediate voltage with the small pulsating voltage can be obtained while preventing the microprocessor from being initialized at random; and the stabilization voltage with low electric power consumption and high accuracy can be obtained via the first or the second constant voltage controlled power supply.

In addition, an advantageous effect exists in that a voltage drop at the time when the switching element which is for obtaining the intermediate voltage is close-circuited and driven becomes small, whereby a minimum guaranteed voltage of the power supply voltage can be set to be smaller.

Furthermore, in the vehicle-mounted electronic control device of the preferred embodiment 1, the upstream side coil 21b serving as the inductive element is connected in series between the switching element 20A and the vehicle-mounted battery 11; and the power supply capacitor 22b is connected between the upstream side coil 21b and the ground circuit GND on the downstream side of the upstream side coil. The upstream side coil 21b has inductance Lb whose value is smaller than inductance La of the downstream side coil 21a, and the power supply capacitor 22b has capacitance Cb whose value is larger than capacitance Ca of the output capacitor 22a. The reset circuit 80 generates a reset signal RST for the microprocessor 51 when the power supply voltage Vb fed from the vehicle-mounted battery 11 or the actual working power supply voltage Vbb that is a voltage at both ends of the power supply capacitor 22b becomes less than a predetermined determination threshold voltage Vsb, and the determination threshold voltage Vsb is set to a voltage which is lower than a higher stabilization voltage of either the first stabilization voltage Vcc generated by the first constant voltage controlled power supply 30 or the second stabilization voltage Vdd generated by the second constant voltage controlled power supply 40.

That is, in the vehicle-mounted electronic control device of the preferred embodiment 1, in order to suppress electromagnetic induction noise generated in power supply line in response to switching operation of the switching element, the upstream side coil and the power supply capacitor are connected on the upstream side of the switching element, an undershoot of the input voltage of the switching element generated by the upstream side coil and the power supply capacitor is controlled so as to be smaller than an undershoot of the intermediate voltage generated by the downstream side coil and the output capacitor, and the reset circuit of a duplex system, which initializes the microprocessor when the power supply voltage and the intermediate voltage become less than predetermined values, is provided.

Therefore, features are provided in that, the reset circuit immediately resets the microprocessor when the power supply voltage is steeply decreased, and the microprocessor is reset by the reset circuit before the microprocessor erroneously operates when the intermediate voltage is gradually decreased and abnormally lowered; and thus, even when capacitance of capacitor for keeping power supply provided at upstream and downstream positions of the first constant voltage controlled power supply and the second constant voltage controlled power supply are small, the microprocessor does not erroneously operate and a small size and inexpensive power supply circuit can be configured.

Furthermore, in the vehicle-mounted electronic control device of the preferred embodiment 1, the reset circuit 80 has hysteresis characteristics in which when the intermediate voltage Va is less than a first determination threshold voltage Vsa, a reset signal RST which is for initializing the microprocessor 51 is generated; and after the intermediate voltage Va becomes equal to or higher than the first determination threshold voltage Vsa and the reset signal RST is released, the intermediate voltage Va is lowered to less than a second determination threshold voltage $Vsaa=Vsa-\Delta Vsa$ that is a value smaller than the first determination threshold voltage Vsa, whereby the reset signal RST is generated.

That is, the reset circuit which is operated in response to abnormal lowering of the intermediate voltage has the hysteresis characteristics; and when the power supply voltage is decreased, the reset signal is generated at a voltage lower than that when the power supply voltage is increased.

Therefore, a feature is provided in that, in the case where a temporal undershoot is generated in the power supply voltage, the reset signal is not generated at random.

Furthermore, in the vehicle-mounted electronic control device of the preferred embodiment 1, a value of a differential voltage $\Delta Vsa$ between the first determination threshold voltage Vsa and the second determination threshold voltage Vsaa in the reset circuit 80 is set to a value equal to or higher than a decreased deviation voltage $\Delta Vb$ due to an undershoot of the power supply voltage Vb generated by the upstream side coil 21b.

That is, a differential voltage between the determination thresholds provided in the reset circuit is set to the value equal to or higher than the undershoot voltage of the power supply voltage generated by the upstream side coil.

Therefore, a feature is provided in that emission of electromagnetic induction noise is suppressed by the upstream side coil and the power supply capacitor and the microprocessor can be prevented from being initialized by abnormal lowering of voltage due to the undershoot of the power supply voltage.

Furthermore, in the vehicle-mounted electronic control device of the preferred embodiment 1, the first constant voltage controlled power supply 30 which feeds to the subsidiary control circuit section 55 and the second constant voltage controlled power supply 40 which feeds to the main control circuit section 54 are connected at a downstream position of the switching element 20A; the first stabilization voltage Vcc generated by the first constant voltage controlled power supply 30 has a value larger than the second stabilization voltage Vdd generated by the second constant voltage controlled power supply 40; and each of the determination threshold voltage Vsb in which the reset circuit 80 generates a reset signal for the microprocessor 51 when the power supply voltage Vb or the actual working power supply voltage Vbb is abnormally lowered and the first determination threshold voltage Vsa in which the reset circuit 80 generates a reset signal for the microprocessor 51 when the intermediate voltage Va is abnormally lowered is an intermediate value that is smaller than the first stabilization voltage Vcc and larger than the second stabilization voltage Vdd.

That is, each of the determination threshold of the power supply voltage in which the reset circuit generates the reset signal for the microprocessor and the first determination threshold voltage for the intermediate voltage is the intermediate value that is smaller than the first stabilization voltage and larger than the second stabilization voltage; and the microprocessor is operated by the second stabilization voltage.

Therefore, features are provided in that when the power supply voltage is steeply decreased, the reset signal is generated depending on the determination threshold voltage for the power supply voltage; however, the intermediate voltage and the first stabilization voltage transiently maintain a normal value and therefore the microprocessor is not erroneously operated; and when the power supply voltage is gradually decreased, the reset signal is generated depending on the first determination threshold voltage for the intermediate voltage, the second stabilization voltage maintains a normal value at the time when the reset signal is generated, and erroneous operation of the microprocessor is not generated.

Furthermore, in the vehicle-mounted electronic control device of the preferred embodiment 1, the switching element 20A is provided with a negative feedback duty factor control circuit which performs switching control of the switching element by a current carrying duty in response to a deviation integral value of a detection voltage proportional to the intermediate voltage Va and a predetermined comparison reference voltage Vs0. The negative feedback duty factor control circuit is operated using the first stabilization voltage Vcc as a power supply voltage, the negative feedback duty factor control circuit being composed of the later stage comparator 60 and an input signal circuit for the later stage comparator 60, the input signal circuit including the comparison circuit 62, the deviation integration circuit 64, and the pulse width modulation control circuit 61; whereas, the determination threshold voltage Vsb used in the reset circuit 80, the first determination threshold voltage Vsa, and the comparison reference voltage Vs0 to be applied to the comparison circuit 62 are generated by a reference voltage generating circuit 63 fed from the power supply voltage Vb or the actual working power supply voltage Vbb.

That is, the negative feedback duty factor control circuit is operated using the first stabilization voltage and the reference voltage generated by the reference voltage generating circuit, as a power supply. Then, the reset circuit is operated using the power supply voltage or the actual working power supply voltage, the intermediate voltage, and the reference voltage generated by the reference voltage generating circuit, as a power supply.

Therefore, features are provided in that the reference voltage generating circuit can immediately generate the reference voltage in response to power-on; and therefore, the negative feedback duty factor control circuit can be controlled in an entire current-carrying state and an output voltage can be immediately increased until the first stabilization voltage reaches a normal value, and the reset circuit operates independently of the state of the first and the second stabilization voltages and the microprocessor can be reliably reset at the time of lowering of the power supply voltage.

Further, in the vehicle-mounted electronic control device of the preferred embodiment 1, the circuit for suppressing reverse conduction 70A compares the first voltage V1 proportional to the power supply voltage Vb fed from the vehicle-mounted battery 11 or the actual working power supply voltage Vbb that is the voltage at both ends of the power supply capacitor 22b with the second voltage V2 proportional to the intermediate voltage Va that is the voltage at both ends of the output capacitor 22a to detect that upstream side potential of the switching element 20A becomes equal to or lower than downstream side potential; whereby, a gate driving circuit of the switching element 20A is interrupted.

That is, the driving circuit of the switching element is interrupted by detecting that the upstream side potential of the switching element which is for obtaining the intermediate voltage becomes equal to or lower than the downstream side potential.

Therefore, features are provided in that a state just before reverse conduction of the switching element is detected by a simple voltage comparison circuit and the switching element is not reversely conducted; and therefore, a close circuit command of the switching element by the negative feedback control circuit which performs switching rate control of the switching element becomes invalid; and accordingly, the generation of an undershoot due to over-discharge of the output capacitor is suppressed.

Preferred Embodiment 2

(1) Explanation of Configuration and Function

A vehicle-mounted electronic control device of a preferred embodiment 2 of the present invention will be described centering around different points from FIG. 1 with reference to FIG. 5 that is a partial circuit block diagram. Incidentally, referring to the drawings, the same reference numerals as those shown in FIG. 1 represent the same or corresponding elements.

Figure 5:
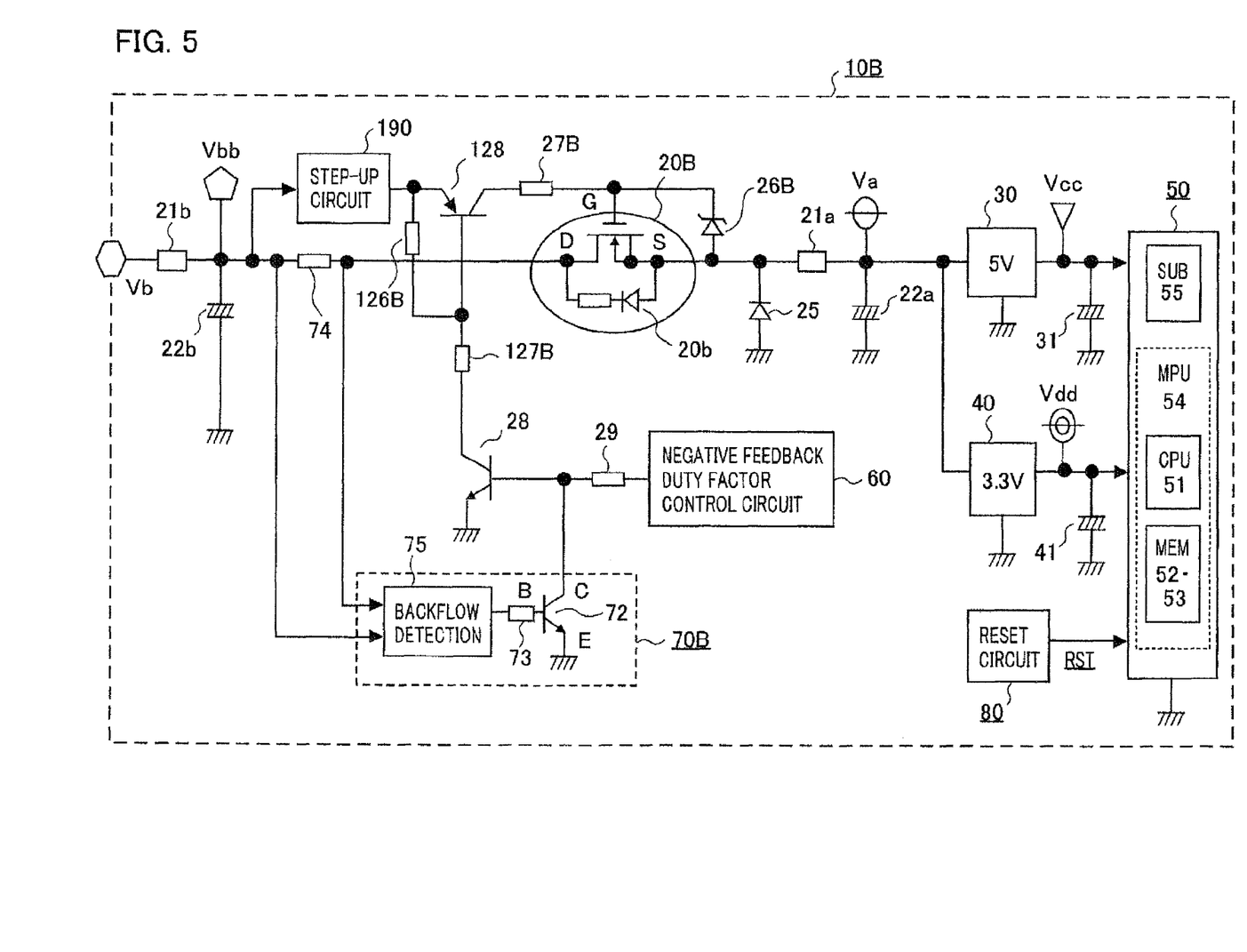
FIG. 5 is a partial circuit block diagram of a vehicle-mounted electronic control device in a preferred embodiment 2 of the present invention.

In FIG. 5, a vehicle-mounted electronic control device 10B housed in a sealed housing is configured such that, as in the device shown in FIG. 1, a power supply serving as a power supply voltage Vb is supplied from a vehicle-mounted battery 11 via an output contact 12 of a power supply relay, and a vehicle-mounted electric load group 14 is driven and controlled in response to an operation state of a vehicle-mounted sensor group 13 and the contents of a control program stored in a program memory 52.

A switching element 20B, which is located in the vehicle-mounted electronic control device 10B and constitutes a switching power supply, is connected in series between the vehicle-mounted battery 11 and a first constant voltage controlled power supply 30 and between the vehicle-mounted battery 11 and a second constant voltage controlled power supply 40. An upstream side coil 21b and a downstream side coil 21a, both of which are choke coils serving as inductive elements, are connected in series to the switching element 20B on the upstream side and the downstream side, respectively. A power supply capacitor 22b is connected between the upstream side coil 21b and a ground circuit GND on the downstream end of the upstream side coil 21b; an output capacitor 22a is connected between the downstream side coil 21a and the ground circuit GND on the downstream end of the downstream side coil 21a; and a flywheel diode 25 is connected between the downstream side coil 21a and the ground circuit GND on the upstream end of the downstream side coil 21a.

The switching element 20B uses an N channel type field effect transistor, and the switching element 20B performs conducting and driving control by an output voltage of a step-up circuit 190 serving as, for example, a charge pump circuit. An output terminal of the step-up circuit 190 is connected to a gate terminal of the switching element 20B via a conduction driving transistor 128 and a driving resistor 27B. A voltage limiting diode 26B is connected between the gate terminal and a source terminal of the switching element 20B. A driving transistor 28 is connected to a base terminal of the driving transistor 128 that is a PNP type junction transistor via a driving resistor 127B. An open-circuit stabilizing resistor 126B is connected between an emitter terminal and a base terminal of the driving transistor 128.

Therefore, opening and closing control of the switching element 20B is performed by a later stage comparator 60 which constitutes a negative feedback duty factor control circuit, via the driving transistor 128 and the driving transistor 28 to generate a desired intermediate voltage Va. Incidentally, the negative feedback duty factor control circuit and a reset circuit 80 for a microprocessor 51 are the same control contents as FIG. 1 and FIG. 2.

A current detecting resistor 74 is connected in series to a drain terminal of the switching element 20B; and when a voltage at both ends of the current detecting resistor 74 exceeds a predetermined value, the switching element 20B is forcibly interrupted to perform overcurrent protection operation by a protection circuit (not shown in the drawing). Furthermore, when the power supply voltage Vb is abnormally lowered and a backward voltage generated in the current detecting resistor 74 by reverse conduction of the switching element 20B exceeds a predetermined value, the output logic level of a backflow detection circuit 75 becomes "H" and an interruption transistor 72 is conducted and driven via a base resistor 73. As a result, the driving transistor 28 becomes nonconductive and the switching element 20B is open-circuited.

Incidentally, even when the switching element 20B itself is open-circuited, a backflow circuit by a parasitic diode circuit 20b is formed in the switching element 20B; and therefore, when a backflow is once started, the output of the backflow detection circuit 75 maintains the logic level "H" and the switching element 20B itself is not intermittently operated, but is continuously interrupted.

When the power supply voltage Vb is recovered and becomes equal to or higher than the intermediate voltage Va, a reverse conductive state of the switching element 20B is released and the output logic level of the backflow detection circuit 75 is returned to "L." As a result, an undershoot of the intermediate voltage Va is suppressed, the undershoot being generated when the power supply voltage Vb is temporarily steeply decreased. Therefore, the vehicle-mounted electronic control device of the preferred embodiment 2 shown in FIG. 5 is also operated as shown in the time charts shown in FIG. 3 and FIG. 4 as in the preferred embodiment 1 of FIG. 1.

Incidentally, the above description has been made that the switching element 20B is the N channel type field effect transistor; however, it is to be understood that, in place of this, the N channel type field effect transistor can be replaced with the P channel type field effect transistor as described in FIG. 1.

(2) Features of Preferred Embodiment 2

As is apparent from the above description, the vehicle-mounted electronic control device of the preferred embodiment 2 of the present invention has the following features.

The vehicle-mounted electronic control device of the preferred embodiment 2 of the present invention includes: the switching element 20B constituting a switching power supply which is operated using a power supply voltage Vb fed from the vehicle-mounted battery 11 as an input voltage and is for stepping down the power supply voltage Vb to generate a predetermined intermediate voltage Va; the continuously controlled type first constant voltage controlled power supply 30 or the same type second constant voltage controlled power supply 40, which is connected in series to a later stage of the switching element 20B and generates a first stabilization voltage Vcc or a second stabilization voltage Vdd; and the control circuit unit 50 including the main control circuit section 54 which is fed from the second constant voltage controlled power supply and has at least the microprocessor 51, the program memory 52, and the RAM memory 53, or the subsidiary control circuit section 55 which is fed from the first constant voltage controlled power supply and is operative in cooperation with the main control circuit section 54. In the vehicle-mounted electronic control device 10B, the downstream side coil 21a serving as an inductive element is connected in series between the switching element 20B and the first constant voltage controlled power supply 30 or between the switching element 20B and the second constant voltage controlled power supply 40; the flywheel diode 25 is connected between the downstream side coil 21a and the ground circuit GND on the upstream side of the downstream side coil; and the output capacitor 22a is connected between the downstream side coil 21a and the ground circuit GND on the downstream side of the downstream side coil. Then, a value of an induced time constant La/R0 which is a ratio between inductance La of the downstream side coil 21a and load resistance R0 of an electric load fed from the switching element 20B uses a value larger than a switching cycle at which switching control of the switching element 20B is performed; the switching element 20B is an N channel type or a P channel type field effect transistor; and the circuit for suppressing reverse conduction 70B is connected to a gate circuit of the field effect transistor. Furthermore, the reset circuit 80 which is for initializing at least the microprocessor 51 when the intermediate voltage Va is lowered to less than a predetermined value is provided; when the power supply voltage Vb is temporarily and abnormally lowered, charging electric charge of the output capacitor 22a is flown back to the upstream power supply side by reverse conduction of the switching element 20B to suppress from generating an undershoot; and the reset circuit 80 prevents the microprocessor 51 from being initialized by the undershoot.

Then, the circuit for suppressing reverse conduction 70B interrupts a gate driving circuit of the switching element 20B by the fact that a backward voltage due to reverse conduction of the switching element 20B is detected by a voltage at both ends of the current detecting resistor 74 connected in series to the switching element 20B, and the current detecting resistor 74 is used for overcurrent interruption control for the switching element 20B during normal operation.

That is, in the preferred embodiment 2, the gate driving circuit of the switching element is interrupted by the current detecting resistor connected in series to the switching element which is for obtaining the intermediate voltage and by the fact that the reverse conduction of the switching element is detected by the voltage at both ends of the current detecting resistor.

Therefore, features are provided in that a reverse conductive state of the switching element is detected by using the current detection circuit together, so that the switching element is not reversely conducted; and thus, reverse conduction current is restricted to equal to or lower than a predetermined value, the generation of the undershoot due to over-discharge of the output capacitor is suppressed, and an overcurrent suppression control function of the switching element can be added by using the current detecting resistor connected in series to the switching element.

Various modifications and alternations of this invention will be apparent to those skilled in the art without departing from the scope and spirit of this invention, and it should be understood that this is not limited to the illustrative embodiments set forth herein.

What is claimed is:

1. A vehicle-mounted electronic control device comprising:
   a switching element constituting a switching power supply which is operated using a power supply voltage fed from a vehicle-mounted battery as an input voltage and is for stepping down the power supply voltage to generate a predetermined intermediate voltage;
   a continuously controlled type first constant voltage controlled power supply or a same type second constant voltage controlled power supply, which is connected in series to a later stage of said switching element and generates a first stabilization voltage or a second stabilization voltage; and a control circuit unit including a main control circuit section which is fed from said second constant voltage controlled power supply and has at least a microprocessor, a program memory, and a RAM memory, or a subsidiary control circuit section which is fed from said first constant voltage controlled power supply and is operative in cooperation with said main control circuit section, wherein a downstream side coil serving as an inductive element is connected in series between said switching element and said first constant voltage controlled power supply or between said switching element and said second constant voltage controlled power supply;

a flywheel diode is connected between said downstream side coil and a ground circuit on the upstream side of said downstream side coil;

an output capacitor is connected between said downstream side coil and said ground circuit on the downstream side of said downstream side coil;

a value of an induced time constant which is a ratio between inductance of said downstream side coil and load resistance of an electric load fed from said switching element uses a value larger than a switching cycle at which switching control of said switching element is performed;

said switching element is a P channel type or an N channel type field effect transistor;

a circuit for suppressing reverse conduction is connected to a gate circuit of said field effect transistor;

a reset circuit which is for initializing at least said microprocessor when the intermediate voltage is lowered to less than a predetermined value is provided;

when the power supply voltage is temporarily and abnormally lowered, charging electric charge of said output capacitor is flown back to the upstream power supply side by reverse conduction of said switching element to suppress from generating an undershoot; and said reset circuit prevents said microprocessor from being initialized by the undershoot of said output capacitor.

2. The vehicle-mounted electronic control device according to claim 1, wherein said reset circuit has hysteresis characteristics in which when the intermediate voltage is less than a first determination threshold voltage, a reset signal which is for initializing the microprocessor is generated, and after the intermediate voltage becomes equal to or higher than the first determination threshold voltage and the reset signal is released, the intermediate voltage is lowered to less than a second determination threshold voltage that is a value smaller than the first determination threshold voltage, whereby the reset signal is generated.

3. The vehicle-mounted electronic control device according to claim 2, further comprising:

an upstream side coil serving as an inductive element which is connected in series between said switching element and said vehicle-mounted battery; and a power supply capacitor which is connected between said upstream side coil and a ground circuit on the downstream side of said upstream side coil, said upstream side coil having inductance whose value is smaller than inductance of said downstream side coil, and said power supply capacitor having capacitance whose value is larger than capacitance of said output capacitor, wherein said reset circuit generates a reset signal for said microprocessor when the power supply voltage fed from said vehicle-mounted battery or an actual working power supply voltage that is a voltage at both ends of said power supply capacitor becomes less than a predetermined determination threshold voltage, the determination threshold voltage being set to a voltage which is lower than a higher stabilization voltage of either the first stabilization voltage generated by said first constant voltage controlled power supply or the second stabilization voltage generated by said second constant voltage controlled power supply.

4. The vehicle-mounted electronic control device according to claim 3, wherein a value of a differential voltage between the first determination threshold voltage and the second determination threshold voltage in said reset circuit is set to a value equal to or higher than a decreased deviation voltage due to an undershoot of the power supply voltage generated by the upstream side coil.

5. The vehicle-mounted electronic control device according to claim 3, wherein said first constant voltage controlled power supply which feeds to said subsidiary control circuit section and said second constant voltage controlled power supply which feeds to said main control circuit section are connected at a downstream position of said switching element;

the first stabilization voltage generated by said first constant voltage controlled power supply has a value larger than the second stabilization voltage generated by said second constant voltage controlled power supply; and each of the determination threshold voltage in which said reset circuit generates a reset signal for said microprocessor when the power supply voltage or the actual working power supply voltage is abnormally lowered and the first determination threshold voltage in which said reset circuit generates a reset signal for said microprocessor when the intermediate voltage is abnormally lowered is an intermediate value that is smaller than the first stabilization voltage and larger than the second stabilization voltage.

6. The vehicle-mounted electronic control device according to claim 5, further comprising a negative feedback duty factor control circuit with which said switching element is provided, said negative feedback duty factor control circuit performing switching control of said switching element by a current carrying duty in response to a deviation integral value of a detection voltage proportional to the intermediate voltage and a predetermined comparison reference voltage, said negative feedback duty factor control circuit being operated using the first stabilization voltage as a power supply voltage, said negative feedback duty factor control circuit being composed of a later stage comparator and an input signal circuit for said later stage comparator, said input signal circuit including a comparison circuit, a deviation integration circuit, and a pulse width modulation control circuit, whereas, the determination threshold voltage used in said reset circuit, the first determination threshold voltage, and the comparison reference voltage to be applied to said comparison circuit are generated by a reference voltage generating circuit fed from the power supply voltage or the actual working power supply voltage.

7. The vehicle-mounted electronic control device according to claim 1,
wherein said circuit for suppressing reverse conduction compares a first voltage proportional to the power supply voltage fed from said vehicle-mounted battery or the actual working power supply voltage that is the voltage at both ends of said power supply capacitor with a second voltage proportional to the intermediate voltage that is the voltage at both ends of said output capacitor to detect that upstream side potential of said switching element becomes equal to or lower than downstream side potential; whereby, a gate driving circuit of said switching element is interrupted.

8. The vehicle-mounted electronic control device according to claim 1,
wherein said circuit for suppressing reverse conduction interrupts a gate driving circuit of said switching element by the fact that a backward voltage due to reverse conduction of said switching element is detected by a voltage at both ends of the current detecting resistor connected in series to said switching element, said current detecting resistor being used for overcurrent interruption control for said switching element during normal operation.

* * * * *